United States Patent

[11] 3,542,335

| [72] | Inventor | Domer Scaramucci<br>3245 S. Hattie, Oklahoma City, Oklahoma 73129 |
|---|---|---|
| [21] | Appl. No. | 750,946 |
| [22] | Filed | Aug. 7, 1968 |
| [45] | Patented | Nov. 24, 1970 |

[54] DOWNSTREAM SEALING BALL VALVES
17 Claims, 6 Drawing Figs.

[52] U.S. Cl. .................................... 251/172, 251/315, 251/317
[51] Int. Cl. .................................... F16k 5/20
[50] Field of Search .................................... 251/170, 171, 172, 174, 175, 315, 307

[56] References Cited

UNITED STATES PATENTS

| 3,011,757 | 12/1961 | Miller | 251/172 |
|---|---|---|---|
| 3,047,265 | 7/1962 | Kaiser | 251/172 |
| 3,219,055 | 11/1965 | Dumm | 251/174X |
| 3,228,652 | 1/1966 | Antrim | 251/175 |
| 3,335,999 | 8/1967 | Lowrey | 251/174X |
| 3,357,679 | 12/1967 | Gulick | 251/172 |
| 3,363,650 | 1/1968 | Scaramucci | 251/175X |
| 3,401,915 | 9/1968 | Kim | 251/174 |

*Primary Examiner*—Harold W. Weakley
*Attorney*—Dunlap, Laney, Hessin and Dougherty ABSTRACT: An improved valve having a seat assembly which is continually biased toward the valve member during all stages of operation of the valve. The upstream seat assembly is responsive to pressure in the valve chamber for relieving body pressure. The effectiveness of the seal between the valve member and the downstream seat assembly and between the valve body and the downstream seat assembly is increased proportionally with an increase in the pressure in the valve chamber. The improved valve thus provides effective downstream sealing thereby reducing the torque usually required with valves utilizing upstream sealing means, and yet will function to effectively relieve excessive buildup in body pressure, thereby eliminating the danger resulting from such buildup.

Patented Nov. 24, 1970
3,542,335
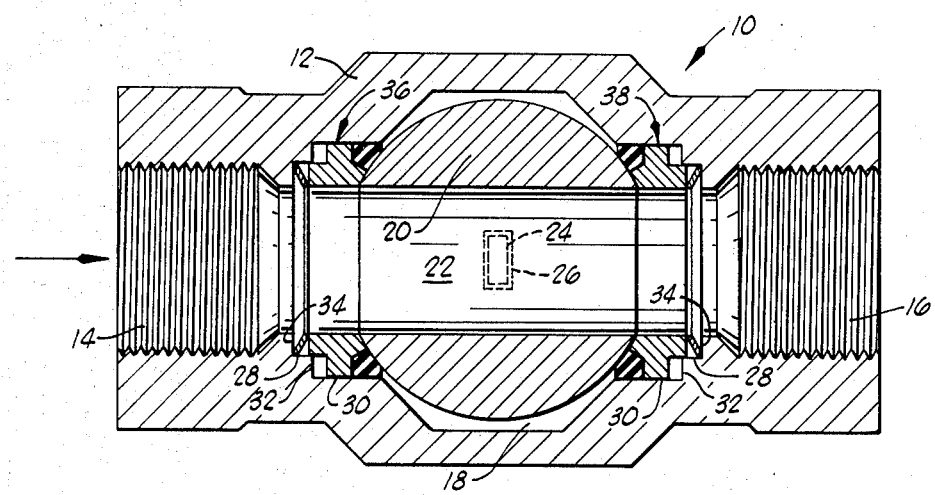
Fig. 1
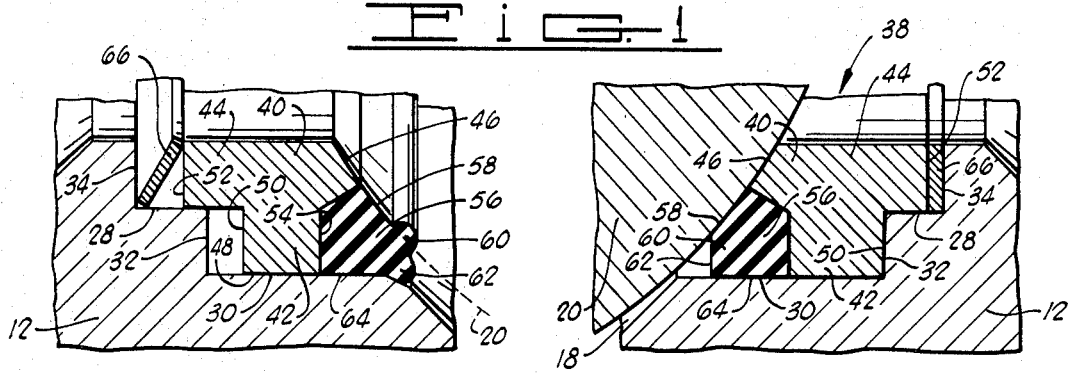
Fig. 2    Fig. 3
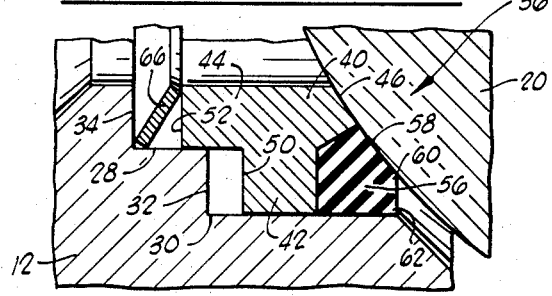
Fig. 4
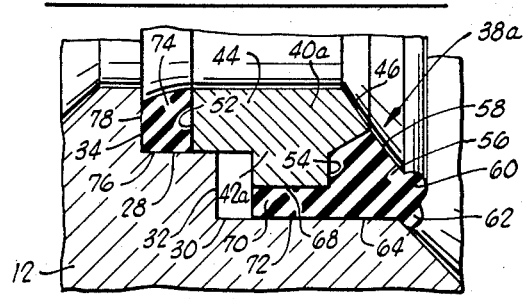
Fig. 5
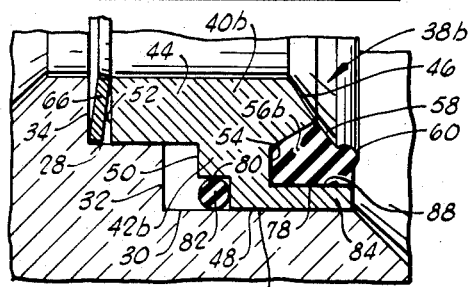
Fig. 6
INVENTOR.
DOMER SCARAMUCCI
BY
ATTORNEYS

DOWNSTREAM SEALING BALL VALVES

BACKGROUND OF THE INVENTION

1. Field of the Invention

This invention relates generally to improvements in ball valves, and more particularly, but not by way of limitation, to an improved seat assembly for ball valves.

2. Description of the Prior Art

It has been a recognized problem in the construction of valves to provide a downstream pressure responsive seat which could be effectively retained by a rigid member and yet one which would be capable of providing an efficient and effective valve seat and relieve excessive body pressure which builds up in the valve chamber.

One approach to this problem, which has received wide acceptance in the industry and proved to be a valuable contribution to the art, was to provide a seat assembly in which the seal member was exposed to body pressure and of a design to be responsive to the pressure in the valve chamber. In this design, the pressure-responsive seal was supported and protected by means of a rigid ring which was firmly positioned in the valve body. The effectiveness of this seat assembly was dependent, to some extent, upon the correct positioning of the ring in the valve chamber, since the ring was not movable, but rather its position was firmly fixed in the valve body with respect to the valve member. The fixed positioning of the seat assembly resulted in the requirement that close machining tolerances be maintained in the construction of the valve and in the fact that the valve was not capable of relieving excessive body pressure.

In an effort to solve some of the above-mentioned problems, a seat assembly was introduced which also provided a pressure-responsive seal exposed to the pressure in the valve chamber, but in addition was movably mounted in the valve body, thereby eliminating the requirement of close machining tolerances. The seat assembly being movable in the valve body and because of the particular design of the seal member, was capable, to some extent, of relieving excessive body pressure. The seat assembly was designed, however, such that it was not firmly supported in any position with respect to the valve member, but rather was supported, when in a seating position, by a resilient member. Not being firmly supported, the seat assembly was not capable of providing sufficient support for the bearing surface of the ring when engaging the valve member.

This seat assembly also relies solely upon the pressure in the valve to move the seat assembly into initial engagement with the valve member.

SUMMARY OF THE INVENTION

The present invention contemplates a valve comprising a body having an inlet opening, a valve chamber, and an outlet opening therein forming a flow passageway therethrough. A valve member is supported in the valve chamber for opening and closing the flow passageway through the body and for movement toward the outlet opening in response to a pressure differential when in a closed position. A seat assembly is located in the valve chamber around the outlet opening and cooperates with the adjacent walls of the valve chamber and the valve member to close the flow passageway through the body. The seat assembly comprises a ring of relatively inflexible material slidingly supported in the valve chamber and having one end face thereof shaped to mate with the valve member to form an annular-shaped bearing surface for the valve member and another surface thereon positioned to engage the valve body when the ring is moved toward the outlet opening to support the valve member. An annular-shaped elastomer means is bonded to the ring at the outer periphery of the bearing surface exposed to the valve chamber and having a valve member end surface thereon positioned to sealingly engage the valve member when the valve member is in engagement with the bearing surface. A tensioning member is supported in the body and biases the seat assembly in a direction toward the valve member.

An object of the invention is to provide a valve with improved downstream sealing, thereby reducing the high torque requirement inherent in valves utilizing upstream sealing means.

Another object of the invention is to provide an improved seat assembly for use in valves which is capable of effectively performing the required sealing function and yet is capable of relieving excessive fluid pressure which may build up in the valve chamber.

A further object of the invention is to provide an improved seat assembly design which may be used in the upstream and downstream ends of the valve, thereby eliminating the requirement for two different types of seat assemblies.

A still further object of the invention is to provide an improved seat assembly whereby the precision placement of the seat assembly is eliminated.

One further object of the invention is to provide an improved seal means whereby the body pressure will augment the effectiveness of the sealing and yet is capable of relieving excessive body pressure.

Another object of the invention is to provide an improved valve which is economical in construction and operation and to increase the efficiency thereof.

Other objects and advantages of the invention will be evident from the following detailed description when read in conjunction with the accompanying drawings which illustrate various embodiments of the invention.

BRIEF DESCRIPTION OF THE DRAWINGS

FIG. 1 is a sectional view through a valve looking up toward the valve stem.

FIG. 2 is an enlarged typical cross-sectional view through a seat assembly used in the valve of FIG. 1.

FIG. 3 is a view similar to FIG. 2 illustrating the operation of the seat assembly at the downstream end of a valve.

FIG. 4 is a view similar to FIG. 3, but illustrating the operation of the seat assembly at the upstream end of a valve.

FIG. 5 is a view similar to FIG. 2 of a modified seat assembly.

FIG. 6 is another view similar to FIG. 2 of another modified seat assembly.

DESCRIPTION OF THE PREFERRED EMBODIMENTS

Referring to the drawings in detail, and particularly FIG. 1, reference character 10 generally designates a complete valve which includes a body 12 having an inlet 14 and an outlet 16 communicating with the opposite ends of a valve chamber 18. It will be readily understood by those skilled in the art that the inlet 14 and outlet 16 may be of any desired construction, such as flanged members, rather than being internally threaded as illustrated in FIG. 1. A valve member in the form of a ball 20 having a port 22 therethrough is positioned in the valve chamber 18 for opening and closing the valve upon turning movement thereof in the usual fashion.

The ball 20 is turned by means of a stem 24 which will project out of the top (not shown) of the valve body 12. As shown in dashed lines in FIG. 1, the valve stem 24 is of rectangular cross section to mate with a slot 26 in the top of the valve ball 20, such that the ball 20 will be turned upon turning of the valve stem 24, yet the ball 20 is free to move upstream and downstream when in a closed position with the port 22 turned at right angles to the inlet 14 and outlet 16. Thus, the valve ball 20 is of the type known in the art as a "floating" valve member or ball.

Each end of the valve chamber 18 is provided with concentric counterbores 28 and 30 forming cylindrical walls in alinement with the respective inlet or outlet of the valve. The counterbores 28 and 30 provide an annular shoulder 32 extending normal to the axis of the respective inlet or outlet and facing the interior of the valve chamber 18. Another annular shoulder 34 is formed between the smaller counterbore 28 and the respective inlet or outlet, and the shoulder 34 also extends normal to the axis of the respective inlet or outlet and faces the interior of the valve chamber 18. The counterbores 28 and 30 are provided to receive and cooperate with upstream and downstream seat assemblies generally designated by reference characters 36 and 38, respectively. In a preferred form, the seat assemblies 36 and 38 are of the same construction, so it will be necessary only to describe one of such seat assemblies in detail.

A preferred seat assembly construction is illustrated in its relaxed condition in FIG. 2 and basically comprises an L-shaped ring 40, having a pair of legs 42 and 44 and further having what is sometimes herein called a valve member end surface 46 shaped to mate with the outer surface of the respective valve member 20 with which the seat assembly is to cooperate. In the present form of the invention, the surface 46 forms an annular-shaped bearing surface for the valve member 20 and is curved on the arc of a circle corresponding to the curvature of the outer surface of the ball 20.

The leg 42 of the L-shaped ring 40 is disposed in the larger counterbore 30 of valve body 12, at the respective end of the valve in which the assembly is to be used. The end 48 of leg 42 forms the outer diameter of the L-shaped ring 40, said diameter being sized to provide a sliding fit thereof in the counterbore 30 of valve body 12. The opposite or nonvalve member end 50 of leg 42 is shaped normal to the axis through the ring to abut the respective shoulder 32 of counterbore 30 in the end of the valve chamber.

The other leg 44 of the L-shaped ring 40 extends axially outward in a direction opposite the valve member end. The leg 44, which is approximately at an angle of 90° from leg 42 of L-shaped ring 40, is sized to slidingly fit in the smaller counterbore 28 of valve body 12. The nonvalve member end 52 of leg 44 is shaped normal to the axis through the ring 40.

The ring 40 is formed of a relatively inflexible material, such as metal or one of the fluorocarbon plastic materials, such as nylon or Teflon, to function as a bearing for supporting the valve member 20 at the downstream end of the valve, as will be set forth more fully below.

The valve member end of the leg 42 is provided with a groove 54 which extends from the surface 46 of L-shaped ring 40 to the outer diameter of the L-shaped ring 40 which is defined by the end 48 of leg 42 and an annular shaped elastomer 56, such as natural or synthetic rubber is bonded in the groove 54. The exposed surface 58 of the elastomer 56 is formed on a slightly smaller radius than surface 46 of the L-shaped ring 40 in order to progressively protrude beyond the surface 46 from the inner periphery of surface 58 adjacent surface 46 of the L-shaped ring 40.

At the end of surface 58 furtherest from the surface 46 of the L-shaped ring 40, an annular bead 60 is formed. The annular bead 60 extends radially inward from the surface 58 of elastomer 56 generally in a direction toward the center of valve member 20 of valve 10. A second annular bead 62 is formed adjacent, and at an angle of approximately 90°, to annular bead 60 of elastomer 56. The annular bead 62 is also adjacent the surface 64 of elastomer 56, the surface 64 being sized to maintain a sliding and sealing fit with the walls of the counterbore 30 of valve body 12. It should be noted that the size of the elastomer 56 with respect to the size of the L-shaped ring 40, as shown in FIG. 1 is exaggerated. The size of the annular beads 60 and 62 is, also exaggerated, and in actual practice the annular beads 60 and 62 may have a radius of approximately .015 inches. The exaggerations of FIG. 1 herebefore mentioned have been made solely for the purpose of clarity in describing the physical attributes of the upstream and downstream seat assemblies 36 and 38 respectively. The purpose of the annular beads 60 and 62 and the reasons for their particular placement with respect to elastomer 56 and valve member 20 of valve 10 will become more fully apparent hereinafter.

It may be observed in FIG. 2 that a tensioning spring 66 such as a Bellville spring, is disposed in counterbore 28 of valve body 12. One end of the tensioning spring 66 is placed adjacent annular shoulder 34 of counterbore 28 and the opposite end of the tensioning spring 66 is placed adjacent the nonvalve member end 52 of leg 44. The purpose of the tensioning spring 66 and the reason for its particular placement is to maintain a tensioning force on the L-shaped ring 40 in the general direction of the valve member 20 of valve body 10 and will be more fully explained hereinafter.

OPERATION OF THE EMBODIMENTS OF FIGURES 1 AND 2

When the valve ball 20 is centered in the valve chamber 18, as when the valve is open as shown in FIG. 1, the tensioning spring 66 on both of the seat assemblies 36 and 38 acts under a state of partial compression to bias the seat assemblies toward the valve member 20 of valve 10, at least to the extent of having the annular beads 60 (FIG. 2) partially deformed. In fact the seat assemblies 36 and 38 are sized such that, in cooperation with the tensioning springs 66, the annular bead 60 of elastomer 58 maintains an initial contact with the surface of the valve member 20 of valve 10 in all operating positions of the valve ball 20.

When the valve ball 20 is turned to a closed position by the stem 24 the ball is free to move downstream with respect to the stem 24, in the event a differential pressure is applied across the valve. Assuming that a pressure does exist at the inlet 14 of valve 10, the ball or valve member 20 (see FIG. 3) will be moved downstream to engage valve member end 46 of L-shaped ring 40 of the downstream seat assembly 38 to in turn move the downstream seat assembly 38 in a downstream direction.

The downstream seat assembly 38 and the valve member 20 of valve 10 will continue moving downstream until the nonvalve member end 50 of the leg 42 engages the annular wall 32 in the valve body 12. The ball 20 will then be supported by the L-shaped ring 40 of the downstream seat assembly. It will also be noted that as the ball 20 of valve 10 moves, the surface thereof engages and deforms the surface 58 and annular bead 60 to form a fluidtight compression seal between the exterior surface of valve member 20 of valve 10 and surface 58 and annular bead 60 of elastomer 56. It may also be observed that as the valve member 20 of valve 10 and the downstream seat assembly 38 move in the downstream direction, the surface 64 of elastomer 56 moves in the downstream direction, thus deforming annular bead 62 and ultimately forming a fluidtight seal between annular bead 62 of elastomer 56 and the surface of counterbore 30 of valve body 12. The force caused by the valve member 20 of valve 10 pushing the downstream seat assembly 38 in the downstream direction contributes directly to the effectiveness of the seal between annular bead 60 and the surface of the valve member 20 and between the annular bead 62 and the counterbore 30 of valve body 12.

It is apparent that the reason the exposed surface 58 of elastomer 56 is formed on a slightly smaller radius than the valve member end 46 of the L-shaped ring 40 is to provide a more effective sealing between the exterior surface of valve member 20 and the surface 58 of elastomer 56.

The position of the nonvalve member end 50 of leg 42 with respect to end 52 of leg 44 and annular shoulder 32 of valve body 12 will serve to limit the travel of the downstream seat assembly 38 in the downstream direction, thereby preventing any permanent deformation or the destruction of tensioning member 66 by end 52 of leg 44.

In the position of the downstream seat assembly 38 shown in FIG. 3, since the annular bead 60 is extended axially inward toward the center of valve member 20 of valve 10, any body pressure existing in chamber 18 of valve body 12 will deform the annular bead 60 toward the exterior surface of valve member 20 and thus will increase or augment the sealing effectiveness in this area. Any body pressure existing in chamber 18 of valve body 12 will also deform annular bead 62 in a direction toward the walls of counterbore 30 of valve body 12, thus increasing or augmenting the sealing effectiveness between the seat assembly 38 and the valve body 12.

When the ball 20 moves downstream, it will move away from the valve member end surface 46 of the upstream seat assembly 36 as shown in FIG. 4. The compressive force of the tensioning spring 66, combined with the upstream pressure acting on the nonvalve member end 52 of leg 44, will move the upstream seat assembly 36 in a downstream direction following the movement of the valve member 20.

In the same manner as previously described, the annular bead 60 will be compressed and deformed against the outer surface of valve member 20 of valve 10. It should, however, be noted that in the upstream seat assembly 36, the annular beads 60 and 62 of elastomer 56 will not form tight seals between the surfaces of the valve member 20 and valve body 12 respectively. It may therefore be appreciated that the seat assembly as shown in FIG. 2 will provide downstream sealing only, not upstream. Thus, the additional friction which is commonly imposed on the valve member when used in connection with upstream sealing is avoided, thereby lowering the torque to turn the valve member 20.

With the valve member 20 of valve 10 in the closed position as shown in FIG. 3 and FIG. 4, should the internal body pressure, that is, the pressure in valve chamber, increase to a sufficiently high value, the body pressure will cause the upstream or downstream seat assemblies 36 or 38 or both, depending on the relative values of the upstream and downstream pressures, to move away from the exterior surface of the valve member 20 of valve 10, thereby relieving the excessive body pressure and preventing any possible resulting damage.

EMBODIMENT OF FIGURE 5

A slightly modified seat assembly 38a, which may be used at both the upstream and downstream ends of the valve 10, is shown in FIG. 5 and is similar to seat assembly 38 of valve 10. This modified seat assembly 38a utilizes an L-shaped ring 40a which is constructed of metal or other relatively inflexible material, having a leg 44 which extends into counterbore 28, a nonvalve member end 52 of leg 44 and a valve member end with a bearing surface 46 formed thereon. A groove 54 is formed in leg 42a and an annular shaped elastomer 56 is bonded in the groove 54. The elastomer 56 comprises a valve member end surface 58, annular beads 60 and 62 and a surface 64, slidingly and sealingly engaging the walls of counterbore 30 of valve body 12, as previously described.

The leg 42a of the L-shaped ring 40 extends into a portion of the counterbore 30 of valve body 12, terminating with the end 68 which forms the outer diameter of the L-shaped ring 40. The said outer diameter formed by the end 68 is less than the diameter of the counterbore 30 of valve body 12. An elastomer pad 70 is formed on the end 68 of leg 42a. The outer diameter of pad 70 forms a surface 72, which is basically concentric with the surface 64 of elastomer 56, and is sized to provide a sliding and sealing fit with the counterbore 30 of valve body 12.

A pusher pad 74 is bonded on the nonvalve member end 52 of leg 44 and is provided with a surface 76 which is sized to provide a sliding and sealing fit with counterbore 28 of valve body 12, and an end portion 78 which is provided to maintain engagement with annular shoulder 34 of counterbore 28. The pusher pad 74 extends axially outward from nonvalve member end 52 of leg 44 to end 78 of pusher pad 74 to a sufficient distance so the pusher pad 74 will be in a compressive state at all times during the operation of valve member 20 of valve 10, as will be explained more fully hereinafter.

OPERATION OF THE EMBODIMENT OF FIGURE 5

It may be appreciated from viewing FIG. 5 that an upstream and downstream seat assembly constructed in accordance with FIG. 5, will operate substantially the same as the upstream and downstream seat assemblies 36 and 38 previously described with respect to FIG. 1 and FIG. 2.

The major difference between the seat assembly shown in FIG. 2 and that shown in FIG. 5 is that the tensioning spring 66 of FIG. 2 has been replaced with a pusher pad 74 which is bonded to the nonvalve member end of leg 44 of L-shaped ring 40. In at least one respect the pusher pad 74 will function exactly like the tensioning spring 66 of FIG. 2 in that pusher pad 74 which is compressed by annular shoulder 34 in cooperation with nonvalve member end 52 of leg 44, will exert a force tending to move the seat assembly 38a in a direction toward the exterior surface of valve member 20 of valve 10, thereby providing at least an initial engagement between the surface 46 of L-shaped member 40 and the exterior surface of valve member 20 of valve 10. When the pusher pad 74 is incorporated into an upstream seat assembly it will also provide an initial sealing with the valve body 12 of valve 10 against the upstream pressure, thereby reducing the leakage of the upstream pressure, through and under surface 64 and 72 of elastomer 56 and pad 70, and thereby reducing the tendency of the upstream pressure to extrude elastomer 56 which is bonded in groove 54.

The excessive body pressure which sometime builds up in valve chamber 18, as previously described, can relieve or dump through the area between the exterior surface of valve member 20 of valve 10 and valve member end 46 of L-shaped ring 40 in a manner similar to that previously described. All other features and advantages previously described with respect to the embodiment of FIG. 1 and FIG. 2 are retained by the particular embodiment shown in FIG. 5.

EMBODIMENT OF FIGURE 6

The modified seat assembly 38b shown in FIG. 6 is another modification of the seat assembly 38a shown in FIG. 5 and is constructed in accordance with the invention. In the seat assembly 38b, the modified L-shaped ring 40b comprises a leg 44, which is approximately 90° from the modified leg portion 42b, and has a valve member end with a bearing surface 46 formed thereon and a nonvalve member end 52. The leg 44 is slidingly disposed in counterbore 28 of valve body 12. A tensioning spring 66 is disposed in counterbore 28 of valve body 12, and one end thereof is positioned adjacent annular shoulder 34 of valve body 12 while the opposite end thereof is place adjacent the nonvalve member end 52 of leg 44.

A groove 54 is formed in the leg 42b, and an annular shaped elastomer 56b is bonded in the groove 54. The elastomer 56b is basically similar to elastomer 56 shown in FIG. 2 and FIG. 5 and comprises a valve member end surface 58, an annular bead 60, and a surface 78 forming the outer diameter of the elastomer 56b.

It should be noted that the elastomer 56b does not have a second annular bead similar to the annular bead 62 of elastomer 56 shown in FIG. 2 and FIG. 5 for reasons which will become apparent hereinafter.

The modified leg 42b of the L-shaped ring 40b comprises an opposite or nonvalve member end 50 shaped normal to the axis through the L-shaped ring 40b to abut the respective shoulder 32 of counterbore 30, and an end 48 which forms the outer diameter of the L-shaped ring 40, which is sized to provide a sliding fit thereof in counterbore 30 of valve body 12. An annular recess 80 is formed in the end 50 of L-shaped ring 40, adjacent end 48 of L-shaped ring 40. An annular seal member 82 is disposed in annular recess 80 and is sized to provide a sliding and sealing fit between the L-shaped ring 40 and the counterbore 30 of valve body 12. A flange portion 84 is extended inward in the general direction of the valve member 20 of valve 10 and is adjacent end 48 and groove 54 of leg 42b of L-shaped member 40b. The outer surface 86 of flange 84 is concentric with the end 48 of leg 42b and is also sized to provide a sliding fit with counterbore 30 of valve body 12. The elastomer 56b is also bonded to the inner surface 88 of flange 84.

OPERATION OF THE EMBODIMENT OF FIGURE 6

It is of course apparent that the modified seat assembly 38b shown in FIG. 6 will operate in a manner basically similar to that previously described with respect to the seat assembly shown in FIG. 2.

The major difference in the seat assemblies 38 of FIG. 2 and 38b of FIG. 6 is that elastomer 56b of FIG. 6 does not function to provide sealing engagement with the valve body 12 of valve 10. The annular seal member 82, which is disposed in annular recess 80, is provided to maintain sliding engagement with the walls of the counterbore 30 of valve body 12. Any excessive body pressure which might be built up in valve chamber 18 of valve body 12 can be relieved or dumped in a manner similar to that previously described with respect to the embodiment shown in FIG. 5, as well as around the outer periphery of the seat assembly 38b past the seal 82.

From the foregoing it will be apparent that the present invention provides a seat assembly which is particularly useful in a valve having a floating valve member. However, the basic invention could also be easily adapted to valves where the valve member is not movable.

The placement of the tensioning spring and its cooperation with the seat assembly virtually eliminates the precision normally required in placing the seats, since the seats in the present invention are biased thereby toward the valve member.

The particular seat assembly provides an effective downstream seal, thereby eliminating the high torque requirements inherent with upstream sealing assemblies and the design is such that it may also be used in the upstream seal position thus eliminating the requirement for two different types of seals in one valve body. The seat assembly described virtually eliminates any of the problems which result with an excessive buildup of pressure in the valve chamber by providing an effective means to dump or relieve this pressure and yet provide the effective downstream seal required.

Changes may be made in the construction and arrangement of parts or elements of the various embodiments herein described without departing from the spirit and scope of the invention as defined in the following claims.

I claim:

1. A valve comprising:
   a body having an inlet opening, a valve chamber, and an outlet opening therein forming a flow passageway therethrough;
   a valve member supported in the valve chamber for opening and closing the flow passageway through the body and for movement toward the outlet opening in response to a pressure differential when in a closed position;
   a seat assembly in the valve chamber around said outlet opening cooperating with the adjacent walls of the valve chamber and the valve member to close the flow passageway through the body, said seat assembly comprising:
     a ring of relatively inflexible material slidingly supported in said valve chamber and having one end face thereof shaped to mate with the valve member to form a single annular-shaped bearing surface for the valve member and another surface thereon positioned to engage the valve body when the ring is moved toward the outlet opening to support the valve member;
     an annular-shaped elastomer means bonded to the ring at the outer periphery of said bearing surface having a valve member end surface thereon positioned to sealingly engage the valve member when the valve member is in engagement with said bearing surface and being sized and disposed such that fluid pressure in the valve chamber will bias the elastomer means into tighter sealing engagement with the valve member; and
     a tensioning member supported in the body biasing the seat assembly in a direction toward the valve member.

2. The valve of claim 1 wherein the annular-shaped elastomer means is characterized further to include a bead portion protruding from the valve member end surface, extending axially inwardly generally toward the valve chamber and sealingly engaging the valve member.

3. The valve of claim 1 wherein the annular-shaped elastomer means is characterized further to include a bead portion protruding in a direction generally toward the valve body, and sealingly engaging the valve body.

4. The valve of claim 1 characterized further to include a seat assembly around the inlet opening.

5. The valve of claim 1 wherein the tensioning member is a spring.

6. The valve of claim 5 wherein the spring is of the Bellville tensioning spring-type.

7. The valve of claim 1 wherein the tensioning member is an elastomer pad having a portion thereof bonded to the relatively inflexible ring.

8. The valve of claim 7 wherein the elastomer pad is sized sufficiently large that a portion thereof remains in contact with the valve body at all times during the operation of the valve.

9. A valve comprising:
   a body having an inlet opening, a valve chamber and an outlet opening therein forming a flow passageway therethrough;
   a valve member supported in the valve chamber for opening and closing the flow passageway through the body;
   a first counterbore formed in the valve body adjacent the outlet opening and forming a first shoulder thereon, said first counterbore having a diameter less than the diameter of the valve chamber;
   a second counterbore formed in the valve body adjacent said first counterbore and forming a second shoulder thereon, said second counterbore having a diameter less than the diameter of said first counterbore;
   a seat assembly supported in said counterbores comprising:
     an L-shaped ring of relatively inflexible material having one end face thereof shaped to mate with the valve member to form a single annular-shaped bearing surface for the valve member, and having first and second legs wherein the first leg is disposed in the first counterbore and engages the first shoulder limiting the movement of the seat assembly, and the second leg is disposed in the second counterbore and is sized to slidingly fit therein;
     a annular-shaped elastomer means bonded to the ring at the outer periphery of said bearing surface having a valve member end surface thereon positioned to sealingly engage the valve member when the valve member is in engagement with said bearing surface and being sized and disposed such that fluid pressure in the valve chamber will bias the elastomer means into tighter sealing engagement with the valve member; and
     a tensioning member supported in the body biasing the seat assembly in a direction toward the valve member.

10. The valve of claim 9 wherein the first leg comprises:
    a valve member end having a groove formed therein, and wherein the annular-shaped elastomer is disposed in said groove; and
    a nonvalve member end generally shaped normal to an axis through the ring to abut the first shoulder, limiting the movement of the seat assembly.

11. The valve of claim 9 wherein the first leg comprises:
    a valve member end having a groove formed therein, the annular-shaped elastomer means being disposed in said groove;
    a nonvalve member end shaped normal to an axis through the ring to abut the first shoulder, limiting the movement of the seat assembly;
    an outer end forming the outer diameter of the ring; and
    an elastomeric pad bonded to the outer end and sized to slidingly and sealingly fit in the first counterbore.

12. The valve of claim 9 wherein the first leg comprises:
    a valve member end having a groove formed therein;
    a nonvalve member end shaped normal to an axis through the ring to abut the first shoulder, limiting the movement of the seat assembly;
    an outer end forming the outer diameter of the ring and sized to slidingly fit in the first counterbore;
    an annular groove formed in the nonvalve member end adjacent the outer end;
    an annular seal means disposed in the annular groove, maintaining sealing engagement with the valve body; and a flange portion adjacent the groove in the valve member end of the leg and further adjacent the outer end of the leg and having an outer surface thereon sized to slidingly fit in the first counterbore.

13. The valve of claim 12 wherein the annular-shaped elastomer means is disposed in a groove and bonded to the valve member end of the leg and the flange portion.

14. The valve of claim 12 wherein the annular seal means is an O-ring.

15. The valve of claim 9 wherein the ring is formed from a fluorocarbon plastic.

16. The valve of claim 9 wherein the valve member is spherical in shape having an aperture extending therethrough.

17. The valve of claim 16 wherein the valve member end surface of the annular-shaped elastomer means is formed on an arc having a diameter less than the diameter of the spherical valve member.